(12) United States Patent
Konno et al.

(10) Patent No.: US 8,530,605 B2
(45) Date of Patent: Sep. 10, 2013

(54) POLY(ARYLENE SULFIDE) AND PRODUCTION PROCESS THEREOF

(75) Inventors: Akihiro Konno, Tokyo (JP); Hiroshi Sakabe, Tokyo (JP); Ken-ichi Takaki, Tokyo (JP)

(73) Assignee: Kureha Corporation, Tokyo (JP)

( * ) Notice: Subject to any disclaimer, the term of this patent is extended or adjusted under 35 U.S.C. 154(b) by 116 days.

(21) Appl. No.: 13/320,484

(22) PCT Filed: May 11, 2010

(86) PCT No.: PCT/JP2010/057931
§ 371 (c)(1),
(2), (4) Date: Nov. 14, 2011

(87) PCT Pub. No.: WO2010/134445
PCT Pub. Date: Nov. 25, 2010

(65) Prior Publication Data
US 2012/0065361 A1    Mar. 15, 2012

(30) Foreign Application Priority Data
May 18, 2009  (JP) ................. 2009-119841

(51) Int. Cl.
*C08G 64/00*  (2006.01)
*C08G 63/02*  (2006.01)
(52) U.S. Cl.
USPC ......................................... 528/196; 528/198
(58) Field of Classification Search
USPC ................................................ 528/381, 388
See application file for complete search history.

(56) References Cited

U.S. PATENT DOCUMENTS

| | | | |
|---|---|---|---|
| 4,645,826 | A | 2/1987 | Iizuka et al. |
| 4,771,120 | A | 9/1988 | Alewelt et al. |
| 4,820,801 | A | 4/1989 | Inoue et al. |
| 5,384,391 | A | 1/1995 | Miyata et al. |
| 2006/0084785 | A1 | 4/2006 | Sato et al. |
| 2011/0124825 | A1 | 5/2011 | Konno et al. |

FOREIGN PATENT DOCUMENTS

| | | | |
|---|---|---|---|
| JP | 62-106929 | A | 5/1987 |
| JP | 62-184026 | A | 8/1987 |
| JP | 63-33775 | B | 7/1988 |
| JP | 2-209925 | A | 8/1990 |
| JP | 5-163349 | A | 6/1993 |
| JP | 2000-191785 | A | 7/2000 |
| WO | 2004/060972 | A | 7/2004 |
| WO | 2010/010760 | A | 1/2010 |

*Primary Examiner* — Terressa Boykin
(74) *Attorney, Agent, or Firm* — Porter Wright Morris & Arthur LLP

(57) ABSTRACT

The invention provides a production process of a poly(arylene sulfide), comprising a polymerization step of subjecting at least one sulfur source selected from the group consisting of alkali metal sulfides and alkali metal hydrosulfides and a dihalo-aromatic compound to a polymerization reaction in an organic amide solvent; a reaction step of adding a hydroxyl group-containing organic compound containing no bonded halogen atom in a proportion of 0.001 to 20 mol per 100 mol of the charged sulfur source into the polymerization reaction system containing the organic amide solvent and a formed polymer after the polymerization step to cause the formed polymer to react with the hydroxyl group-containing organic compound; and a collecting step of collecting a polymer from the polymerization reaction system after the reaction step, and the poly(arylene sulfide).

15 Claims, No Drawings

POLY(ARYLENE SULFIDE) AND PRODUCTION PROCESS THEREOF

TECHNICAL FIELD

The present invention relates to a production process of a poly(arylene sulfide) containing halogen atom(s) (may referred to as "terminal halogen group(s)") bonded to terminal(s) of its polymer chain, the content of the bonded halogen atom(s) in said poly(arylene sulfide) having been reduced. More particularly, the present invention relates to a production process of a poly(arylene sulfide) by subjecting at least one sulfur source selected from the group consisting of alkali metal sulfides and alkali metal hydrosulfides and a dihalo-aromatic compound to a polymerization reaction in an organic amide solvent, by which the content of the bonded halogen atom(s) can be efficiently reduced by a reaction treatment with a hydroxyl group-containing organic compound at a final-stage of a polymerization step.

The present invention also relates to a poly(arylene sulfide) obtained by subjecting at least one sulfur source selected from the group consisting of alkali metal sulfides and alkali metal hydrosulfides and a dihalo-aromatic compound to a polymerization reaction in an organic amide, wherein at least part of bonded halogen atom(s) in said poly(arylene sulfide) has been removed by a reaction with a hydroxyl group-containing organic compound.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical strength, electrical properties, dimensional stability, etc. The PASs are commonly used in a wide variety of technical fields such as electrical equipments, electronic equipments, automotive equipments and packaging materials because they can be molded or formed into various kinds of molded or formed products, films, sheets, fibers, etc. by general melt processing processes such as extrusion, injection molding and compression molding.

As a typical production process of a PAS, is known a process in which a sulfur source is reacted with a dihalo-aromatic compound in an organic amide solvent such as N-methyl-2-pyrrolidone. As the sulfur source, is generally used an alkali metal sulfide, an alkali metal hydrosulfide or a mixture thereof. When the alkali metal hydrosulfide is used as the sulfur source, the alkali metal hydrosulfide is used in combination with an alkali metal hydroxide.

When at least one sulfur source selected from the group consisting of alkali metal sulfides and alkali metal hydrosulfides is subjected to a polymerization reaction with a dihalo-aromatic compound, a great amount of an alkali metal salt such as NaCl is secondarily produced by a desalting polycondensation reaction. The alkali metal salt remaining in the resulting PAS adversely affects the electrical properties of the PAS because the salt is an electrolyte. When the PAS containing the remaining alkali metal salt is applied to a sealing compound or covering material for electronic parts, the alkali metal salt corrodes electrodes and wirings of the electronic parts, causes disconnection or makes a leakage current great.

The problems caused by the alkali metal salt remaining in the PAS have come to be almost overcome at present. A technique for foaming a high-molecular weight granular PAS in a polymerization step is established as disclosed in, for example, Japanese Patent Publication No. 63-33775 (Patent Literature 1). The granular PAS is easy to be sifted by a screen, and impurities such as alkali metal salts and oligomers can be easily removed from the granular PAS by washing. With respect to a purification method of a PAS collected after polymerization also, is adopted an effective washing method by combining, for example, water washing, washing with an organic solvent, acid washing, etc. In fact, the PAS sufficiently washed is purified to the extent that ash derived from the remaining alkali metal salt such as NaCl is substantially not obtained even when it is burnt. As described above, according to the present state of the art, a PAS substantially containing no remaining alkali metal salt can be obtained.

However, it is difficult even by the present state of the art to reduce the content of halogen atom(s) bonded mainly to terminal(s) of a polymer chain of a PAS. When a sulfur source and a dihalo-aromatic compound are subjected to a polymerization reaction, a PAS with halogen atom(s) bound to one terminal or both terminals thereof is formed. This bonded halogen atom cannot be removed by washing. The sulfur source and the dihalo-aromatic compound are reacted in equimolar amounts to form a polymer. In order to stably perform the polymerization reaction, however, it is desirable to adjust a charged molar ration of the dihalo-aromatic compound to the sulfur source in such a manner that the molar ration of the dihalo-aromatic compound to the sulfur source becomes somewhat excessive. On the other hand, if the molar ration of the dihalo-aromatic compound to the sulfur source becomes too excessive, a PAS with halogen atoms bonded to both terminals of its polymer chain is liable to be formed.

The requirement of halogen-free regulation on the whole polymer product from environmental groups is heightened in addition to the requirement of halogen content reduction in PASs by electronic part makers from the viewpoint of the performance of electronic parts, and PAS makers bear the responsibility of satisfying these requirements. In order to reduce the halogen content in a PAS, it is essential to reduce the content of the bonded halogen atoms in addition to the reduction of the remaining alkali metal salt.

As a method for reducing the content of the bonded halogen atoms in the PAS, Japanese Patent Application Laid-Open No. 62-106929 (Patent Literature 2) proposes a method of subjecting poly(phenylene sulfide) (PPS) and a mercapto group-containing compound or a salt thereof to a heat treatment in a solvent capable of dissolving the poly(phenylene sulfide). The method disclosed in Patent Literature 2 includes a step of collecting, washing and drying the PPS after sodium sulfide and p-dichlorobenzene are polymerized in N-methyl-2-pyrrolidone. Patent Literature 2 shows an experimental example that the PPS dried, the mercapto group-containing compound or the salt thereof and the solvent were charged into an autoclave to react them under heating. Patent Literature 2 describes that the contents were poured into water after completion of the reaction under heating, washing with hot water and filtration were conducted repeatedly, washing with methanol was then conducted, and vacuum drying was conducted to isolate a polymer.

According to the method described in Patent Literature 2, PPS whose content of a bonded chlorine has been greatly reduced can be obtained. However, the method of Patent Literature 2 is not efficient because the PPS must be caused to further react with the particular reaction reagent at a high temperature over a long period of time in the solvent after the PPS is collected from the polymerization reaction system and purified after polymerization, and a purification step including filtering, washing and drying is required after the reaction.

In short, the method described in Patent Literature 2 is complicated in operation and moreover also low in energy efficiency.

Japanese Patent Application Laid-Open No. 5-163349 (Patent Literature 3) proposes a process for producing a PAS having a low bonded chlorine content by subjecting a cyclic arylene sulfide oligomer to ring-opening polymerization under heating in the presence of a ring-opening polymerization catalyst. However, the process disclosed in Patent Literature 3 requires to extract a 7- to 15-mer cyclic phenylene sulfide oligomer from a PPS formed after a polymerization reaction of sodium sulfide with p-dichlorobenzene in an organic amide solvent by Soxhlet extraction using methylene chloride as a solvent. Therefore, the process of Patent Literature 3 is not a process suitable for production of the PAS on an industrial scale.

Citation List

Patent Literature

Patent Literature 1: Japanese Patent Publication No. 63-33775 (corresponding to U.S. Pat. No. 4,645,826)

Patent Literature 2: Japanese Patent Application Laid-Open No. 62-106929 (corresponding to U.S. Pat. No. 4,820,801)

Patent Literature 3: Japanese Patent Application Laid-Open No. 5-163349 (corresponding to U.S. Pat. No. 5,384,391)

SUMMARY OF INVENTION

Technical Problem

It is an object of the present invention to provide a production process capable of obtaining a poly(arylene sulfide) whose content of bonded halogen atoms including terminal halogen groups has been reduced by a relatively simple and efficient method capable of being incorporated into a polymerization step.

The present inventors have carried out an extensive investigation with a view toward achieving the above object. As a result, it has been found that after a polymerization step of subjecting at least one sulfur source selected from the group consisting of alkali metal sulfides and alkali metal hydrosulfides and a dihalo-aromatic compound to a polymerization reaction in an organic amide solvent, a hydroxyl group-containing organic compound containing no bonded halogen atom is added into the polymerization reaction system containing the organic amide solvent and a polymer formed to cause the formed polymer to react with the hydroxyl group-containing organic compound, thereby obtaining a poly(arylene sulfide) whose content of bonded halogen atoms has been reduced.

According to the production process of the present invention, the reaction of the formed polymer with the hydroxyl group-containing organic compound can be incorporated into the polymerization step, so that it is only necessary to conduct a step of collecting the PAS once from the reaction mixture to purify it. In other words, according to the production process of the present invention, it is not necessary to dissolve the PAS collected from the polymerization reaction system and purified in the solvent under heating and cause it to react with the reagent. Therefore, according to the production process of the present invention, it is not necessary to conduct the step of collecting the PAS twice from the reaction mixture to purify it repeatedly as disclosed in the method described in Patent Literature 2. According to the production process of the present invention, the hydroxyl group-containing organic compound can be introduced under pressure into the polymerization reaction system lying in a high-temperature state after the polymerization step and caused to react, so that the energy efficiency is high.

When a phase-separation polymerization step that the polymerization reaction is continued in the presence of a phase separation agent in a phase-separated state that a concentrated formed polymer phase and a dilute formed polymer phase are present in a mixed state within the polymerization reaction system after the polymerization reaction of the sulfur source with the dihalo-aromatic compound in the organic amide solvent is initiated is arranged in the production process of the present invention, a granular PAS having average particle diameter of generally at least 100 µm, preferably at least 200 µm can be obtained. Such a granular PAS is easy to be sifted by a screen and high in removal efficiency of the remaining alkali metal salt and oligomers by washing.

According to the production process of the present invention, the content of the bonded halogen atoms, melt viscosity, weight-average molecular weight, average particle diameter, etc. of the resulting PAS can be optionally adjusted by, for example, controlling the polymerization reaction conditions and selecting the kind of the hydroxyl group-containing organic compound. Therefore, according to the production process of the present invention, the various properties of the PAS can be controlled as necessary for the end application intended. The PAS obtained according to the production process of the present invention can be provided as a product having a halogen content suitable for use as a sealing compound for electronic parts by diluting it with a large amount of a filler even when the bonded halogen atom content thereof is not very low. The present invention has been led to completion on the basis of these findings.

Solution to Problem

According to the present invention, there is provided a production process of a poly(arylene sulfide), comprising the following steps:

(1) a polymerization step of subjecting at least one sulfur source selected from the group consisting of alkali metal sulfides and alkali metal hydrosulfides and a dihalo-aromatic compound to a polymerization reaction in an organic amide solvent;

(2) a reaction step of adding a hydroxyl group-containing organic compound containing no bonded halogen atom in a proportion of 0.001 to 20 mol per 100 mol of the charged sulfur source into the polymerization reaction system containing the organic amide solvent and a polymer formed in the polymerization step after the polymerization step to cause the formed polymer to react with the hydroxyl group-containing organic compound; and (3) a collecting step of collecting a polymer formed in the reaction step from the polymerization reaction system containing the formed polymer after the reaction step.

According to the present invention, there is also provided a poly(arylene sulfide) obtained by subjecting at least one sulfur source selected from the group consisting of alkali metal sulfides and alkali metal hydrosulfides and a dihalo-aromatic compound to a polymerization reaction in an organic amide solvent, wherein (a) the poly(arylene sulfide) is a reaction product with a hydroxyl group-containing organic compound containing no bonded halogen atom, and at least part of bonded halogen atoms thereof have been removed by a reaction with the hydroxyl group-containing organic compound, (b) the melt viscosity thereof is 1 to 100 Pa·s as measured at a temperature of 310° C. and a shear rate of 1,216 $\sec^{-1}$, (c) the weight-average molecular weight thereof is 10,000 to 60,000 as measured by gel permeation chromatography,
(d) the average particle diameter thereof is 100 to 1,000 μm as measured by a sifting method, and
(e) the content of bonded halogen atoms thereof is lower than 4,000 ppm as measured by the flask combustion method.

Advantageous Effects of Invention

According to the production process of the present invention, a poly(arylene sulfide) whose content of bonded halogen atoms including terminal halogen groups has been reduced by a relatively simple and efficient method capable of being incorporated into a polymerization step can be obtained. The PAS obtained by the production process according to the present invention can meet the requirements of halogen content reduction from various fields and can be suitably utilized in a wide variety of fields such as electrical and electronic equipments and automotive equipments, including sealing compounds or covering materials for electronic parts.

DESCRIPTION OF EMBODIMENTS

1. Sulfur Source

In the present invention, at least one sulfur source selected from the group consisting of alkali metal sulfides and alkali metal hydrosulfides is used as a sulfur source. As examples of the alkali metal sulfides, may be mentioned lithium sulfide, sodium sulfide, potassium sulfide, rubidium sulfide, cesium sulfide and mixtures of two or more compounds thereof. As examples of the alkali metal hydrosulfides, may be mentioned lithium hydrosulfide, sodium hydrosulfide, potassium hydrosulfide, rubidium hydro sulfide, cesium hydrosulfide and mixtures of two or more compounds thereof.

The alkali metal sulfide may be used in any form of an anhydride, a hydrate and an aqueous solution. Among these, sodium sulfide and lithium sulfide are preferred in that they are industrially available on the cheap. The alkali metal sulfide is preferably used as an aqueous mixture (i.e., a mixture with water having fluidity) such as an aqueous solution from the viewpoints of processing operation, metering, etc.

The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous solution or an aqueous mixture (i.e., a mixture with water having fluidity) from the viewpoints of processing operation, metering, etc.

In general, a small amount of an alkali metal hydrosulfide is secondarily produced in a production process of the alkali metal sulfide. A small amount of the alkali metal hydrosulfide may be contained in the alkali metal sulfide used in the present invention. In this case, the total molar quantity of the alkali metal sulfide and alkali metal hydrosulfide becomes a charged sulfur source after a dehydration step.

On the other hand, in general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a charged sulfur source after a dehydration step. When the alkali metal sulfide and the alkali metal hydrosulfide are mixed and used in combination, a mixture of both naturally becomes a charged sulfur source.

When the sulfur source contains the alkali metal hydrosulfide, an alkali metal hydroxide is used in combination. Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous solution or aqueous mixture.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide.

2. Dihalo-Aromatic Compound

The dihalo-aromatic compound used in the present invention is a dihalogenated aromatic compound having 2 halogen atoms directly bonded to a aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones. Among these, p-dihalobenzenes, m-dihalobenzenes and mixtures of these both compounds are preferred, and p-dihalobenzenes are more preferred.

The halogen atom means each atom of fluorine, chlorine, bromine and iodine, and 2 halogen atoms in the same dihalo-aromatic compound may be the same or different from each other. These dihalo-aromatic compounds may be used either singly or in any combination thereof The charged amount of the dihalo-aromatic compound is generally 0.90 to 1.50 mol, preferably 1.00 to 1.10 mol, more preferably 1.00 to 1.09 mol, particularly preferably more than 1.00 mol, but not more than 1.09 mol per mol of the sulfur source (alkali metal sulfide and/or alkali metal hydrosulfide) remaining in the system after a dehydration step. When the charged amount of the dihalo-aromatic compound falls within the range of 1.01 to 1.09 mol, good results can be yielded in many cases. If a molar ratio of the dihalo-aromatic compound charged to the sulfur source is too high, it is difficult to form a high-molecular weight polymer. If a molar ratio of the dihalo-aromatic compound charged to the sulfur source is too low on the other hand, a decomposition reaction is easy to occur, and it is difficult to stably perform a polymerization reaction. However, when the molar ratio of the dihalo-aromatic compound is made high, the content of terminal halogen groups generally becomes high.

3. Branching or Crosslinking Agent

In order to introduce a branched or crosslinked structure into a formed PAS, a polyhalo-compound (may not be always an aromatic compound), to which at least 3 halogen atoms are bonded, an active hydrogen-containing halogenated aromatic compound, a halogenated aromatic nitro compound or the like may also be used in combination. Preferable examples of the polyhalo-compound as a branching or crosslinking agent include trihalobenzenes.

4. Organic Amide Solvent

In the present invention, an organic amide solvent that is an aprotic polar organic solvent is used as a solvent for a dehydration reaction and a polymerization reaction. The organic amide solvent is preferably stable to an alkali at a high temperature. Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkylcaprolactam compounds and N,N-dialkylimilazolidinone compounds are preferred, and N-methyl-2-pyrrolidone, N-methyl-ε-caprolactam and 1,3-dialkyl-2-imidazolidinones are particularly preferably used. The amount of the organic amide solvent used in the polymerization reaction in the present invention is generally within a range of 0.1 to 10 kg per mol of the sulfur source.

5. Polymerization Aid

In the present invention, various kinds of polymerization aids may be used as needed for promoting the polymerization reaction. Specific examples of the polymerization aids include water, organic carboxylic acid metal salts, organic sulfonic acid metal salts, alkali metal halides such as lithium halides, alkaline earth metal halides, aromatic carboxylic acid alkaline earth metal salts, phosphoric acid alkali metal salts, alcohols, paraffinic hydrocarbons and mixtures of 2 or more compounds thereof, which are generally publicly known as polymerization aids for PASs. Alkali metal carboxylates are preferred as the organic carboxylic acid metal salts. As examples of the alkali metal carboxylates, may be mentioned lithium acetate, sodium acetate, potassium acetate, sodium propionate, lithium valerate, lithium benzoate, sodium benzoate, sodium phenylacetate, potassium p-toluylate and mixtures of 2 or more compounds thereof. Sodium acetate is particularly preferred as the alkali metal carboxylate because it is cheap and easy to be available. The amount of the polymerization aid used varies according to the kind of the compound used. However, it is within a range of generally 0.01 to 10 mol, preferably 0.1 to 2 mol, more preferably 0.2 to 1.8 mol, particularly preferably 0.3 to 1.7 mol per mol of the charged sulfur source. When the polymerization aid is an organic carboxylic acid metal salt, organic sulfonic acid salt or alkali metal halide, it is desirable that the upper limit of the used amount thereof is preferably at most 1 mol, more preferably at most 0.8 mol per mol of the charged sulfur source.

6. Phase Separation Agent

In order to promote the polymerization reaction to obtain a PAS having a high polymerization degree in a short period of time, various kinds of phase separation agents are preferably used in the present invention. The phase separation agent is a compound that is dissolved in the organic amide solvent and has a function of lowering the solubility of the PAS in the organic amide solvent by itself or under the coexistence of a small amount of water. The phase separation agent itself is a compound that is not a solvent for PASs.

As the phase separation agent, may be used a compound generally known to function as a phase separation agent in the technical field of PASs. The above-described compounds used as the polymerization aid are also included in the phase separation agent. In the present invention, however, the phase separation agent means a compound used in an amount or proportion that can function as a phase separation agent in the phase-separation polymerization step. Specific examples of the phase separation agent include water, organic carboxylic acid metal salts, organic sulfonic acid metal salts, alkali metal halides such as lithium halides, alkaline earth metal halides, aromatic carboxylic acid alkaline earth metal salts, phosphoric acid alkali metal salts, alcohols and paraffinic hydrocarbons. As the organic carboxylic acid metal salts, are preferred alkali metal carboxylates such as, for example, lithium acetate, sodium acetate, potassium acetate, sodium propionate, lithium valerate, lithium benzoate, sodium benzoate, sodium phenylacetate and potassium p-toluylate. These phase separation agents may be used either singly or in any combination thereof. Among these phase separation agents, water and alkali metal carboxylates are preferred because they are cheap, and water is particularly preferred. The amount of the phase separation agent used varies with the kind of the compound used. However, it is generally within a range of 0.01 to 10 mol per mol of the charged sulfur source.

When the production process of the present invention includes a phase-separation polymerization step, it is preferable to cause water to exist as the phase separation agent in a proportion of higher than 2.0 mol to not higher than 10 mol, preferably 2.2 to 7 mol, more preferably 2.5 to 5 mol per mol of the charged sulfur source within the polymerization reaction system in the phase-separation polymerization step. Another phase separation agent such as the organic carboxylic acid metal salt than water is used within a range of preferably 0.01 to 3 mol, more preferably 0.02 to 2 mol, particularly preferably 0.03 to 1 mol per mol of the charged sulfur source.

Even when water is used as the phase separation agent, another phase separation agent than water may be used as a polymerization aid in combination from the view point of efficiently conducting phase-separation polymerization. When water and another phase separation agent are used in combination in the phase-separation polymerization step, the total amount thereof may be an amount sufficient to cause phase separation. In the phase-separation polymerization step, water is caused to exist in a proportion of higher than 2.0 mol to not higher than 10 mol, preferably 2.2 to 7 mol, more preferably 2.5 to 5 mol per mol of the charged sulfur source within the polymerization reaction system, and another phase separation agent may be used in combination within a range of preferably 0.01 to 3 mol, more preferably 0.02 to 2 mol, particularly preferably 0.03 to 1 mol. When water and another phase separation agent are used in combination, water is used within a range of 0.5 to 10 mol, preferably 0.6 to 7 mol, particularly preferably 0.5 to 5 mol per mol of the charged sulfur source, and another phase separation agent such as the alkali metal carboxylate may also be used in combination within a range of 0.001 to 0.7 mol, preferably 0.02 to 0.6 mol, particularly preferably 0.05 to 0.5 mol in order to perform phase-separation polymerization with a small amount of the phase separation agents.

7. Dehydration Step

A dehydration step is preferably arranged as a preliminary step for a polymerization step to control the amount of water in the reaction system. The dehydration step is performed by a process comprising heating and reacting a mixture containing the organic amide solvent and the alkali metal sulfide, desirably, under an inert gas atmosphere and discharging water outside the system by distillation. When the alkali metal hydrosulfide is used as a sulfur source, the dehydration step is performed by a process comprising heating and reacting a mixture containing the alkali metal hydrosulfide and an alkali metal hydroxide and discharging water outside the system by distillation.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the content of water coexisting in the polymerization reaction system is reduced to generally 0.02 to 2.0 mol, preferably 0.05 to 2.0 mol, more preferably 0.5 to 2.0 mol per mol of the charged sulfur source. The sulfur source after the dehydration step is called "a charged sulfur source". If the water content has become too low in the dehydration step, water may be added prior to the polymerization step to regulate the water content to a desired value.

When the alkali metal hydrosulfide is used as the sulfur source, a mixture containing the organic amide solvent, the alkali metal hydrosulfide and an alkali metal hydroxide in a proportion of 0.95 to 1.05 mol per mol of the alkali metal hydrosulfide is preferably heated and reacted to discharge at least a part of a distillate containing water from the interior of the system containing the mixture to the exterior of the system in the dehydration step.

If a molar ratio of the alkali metal hydroxide to a mole of the charged alkali metal hydrosulfide in the dehydration step is too low, the amount of a sulfur component (hydrogen sulfide) volatilized off in the dehydration step becomes great, which tends to incur reduction in productivity due to lowering of the amount of the charged sulfur source or cause abnormal reactions and deterioration of quality of a PAS formed due to increase of a polysulfide component in the charged sulfur source remaining after the dehydration. If the molar ratio of the alkali metal hydroxide to a mole of the charged alkali metal hydrosulfide is too high, in some cases, change in properties of the organic amide solvent may be increased, difficulty may be encountered on stably performing the polymerization reaction, or the yield and quality of a PAS formed may be deteriorated. A preferable molar ratio of the alkali metal hydroxide to a mole of the charged alkali metal hydrosulfide in the dehydration step is 0.97 to 1.04, more preferably 0.98 to 1.03.

In many cases, a small amount of an alkali metal sulfide is contained in an alkali metal hydrosulfide, so that the amount of the sulfur source involves a total of the alkali metal hydrosulfide and the alkali metal sulfide. No problem arises as to a raw material for the PAS even if the alkali metal hydrosulfide contains the alkali metal sulfide. However, the content thereof is preferably as low as possible for producing a high-quality PAS in the present invention. Even when a small amount of the alkali metal sulfide is mixed in, the molar ratio to the alkali metal hydroxide may be calculated out on the basis of the content (analytical value) of the alkali metal hydrosulfide in the present invention to regulate the molar ratio between them.

The charging of the respective raw materials into a reaction vessel in the dehydration step is conducted within a temperature range of generally from ordinary temperature (5 to 35° C.) to 300° C., preferably from ordinary temperature to 200° C. The charging order of the raw materials may be optionally set, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred. The amount of the organic amide solvent used is generally of the order of 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system of both systems.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

8. Charging Step

In the present invention, an alkali metal hydroxide and/or water may be added to the mixture remaining in the system after the dehydration step as needed. When the alkali metal hydrosulfide is used as the sulfur source in particular, the mixture is desirably adjusted in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes preferably 1.00 to 1.09 mol, more preferably more than 1.00 mol, but not more than 1.09 mol per mol of a charged sulfur source including the alkali metal hydrosulfide existing in the system after the dehydration as a sulfur source, and the number of moles of water becomes generally 0.02 to 2.0 mol, preferably 0.05 to 2.0 mol, more preferably 0.5 to 2.0 mol per mol of the charged sulfur source. The amount of the charged sulfur source is calculated out in accordance with an equation, [Charged sulfur source]=[Total moles of sulfur charged]−[Moles of sulfur volatilized off after dehydration].

When hydrogen sulfide is volatilized off in the dehydration step, an alkali metal hydroxide is produced by an equilibrium reaction and comes to remain in the system. Accordingly, it is necessary to exactly grasp the amount of hydrogen sulfide volatilized off to determine a molar ratio of the alkali metal hydroxide to the sulfur source in the charging step.

If the molar ratio of the alkali metal hydroxide to a mole of the charged sulfur source is too high, it is liable to increase change in properties of the organic amide solvent or cause abnormal reactions or decomposition reactions upon polymerization. In addition, the lowering of the yield and quality of a PAS formed is often caused. The molar ratio of the alkali metal hydroxide to a mole of the charged sulfur source is preferably 1.01 to 1.08 mol, more preferably 1.015 to 1.075 mol. It is preferable to conduct the polymerization reaction slightly in excess of the alkali metal hydroxide in that the polymerization reaction is stably performed to obtain a high-quality PAS.

In the present invention, the sulfur source in the charging step is decided to be called "a charged sulfur source" for distinguishing it from the sulfur source used in the dehydration step. The reason for it is that the amount of the sulfur source poured into the reaction vessel in the dehydration step is varied by the dehydration step. The charged sulfur source is consumed by a reaction with a dihalo-aromatic compound in the polymerization step. However, the molar quantity of the charged sulfur source is based on a molar quantity in the charging step.

9. Polymerization Step

The polymerization step is conducted by charging a dihalo-aromatic compound into the mixture after completion of the dehydration step and heating the sulfur source and the dihalo-aromatic compound in the organic amide solvent. When a polymerization vessel different from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally 100 to 350° C., preferably 120 to 330° C. When the respective components are charged into the polymerization vessel, no particular limitation is imposed on the order of charging, and the charging is conducted by partially charging both components in small portions or charging both components at a time.

In general, the polymerization reaction is preferably conducted by a two-stage process of a first-stage polymerization step and a second-stage polymerization step at a temperature ranging from 170 to 290° C. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours.

The amount of the organic amide solvent used in the polymerization step is within a range of generally 0.1 to 10 kg, preferably 0.15 to 5 kg per mol of the charged sulfur source existing in the polymerization step. The amount may be changed in the course of the polymerization reaction so far as it falls within this range. The content of the coexisting water upon the beginning of the polymerization reaction is desirably controlled within a range of generally 0.02 to 2.0 mol, preferably 0.05 to 2.0 mol, more preferably 0.5 to 2.0 mol per mol of the charged sulfur source. It is preferable to increase the content of the coexisting water in the course of the polymerization reaction.

In the production process according to the present invention, the polymerization reaction in the polymerization step is preferably conducted through at least two-stage polymerization steps comprising:
i) a first-stage polymerization step of subjecting at least one sulfur source selected from the group consisting of alkali metal sulfides and alkali metal hydrosulfides and a dihalo-aromatic compound to a polymerization reaction in an organic amide solvent to form a polymer that a conversion of the dihalo-aromatic compound is 80 to 99%; and
ii) a second-stage polymerization step of continuing the polymerization reaction in the presence of a phase separation agent in a phase-separated state that a concentrated formed polymer phase and a dilute formed polymer phase are present in a mixed state within the polymerization reaction system.

In the production process according to the present invention, the polymerization reaction in the polymerization step is more preferably conducted through at least two-stage polymerization steps comprising:
I) a first-stage polymerization step of subjecting at least one sulfur source selected from the group consisting of alkali metal sulfides and alkali metal hydrosulfides and a dihalo-aromatic compound to a polymerization reaction at a temperature of 170 to 270° C. in an organic amide solvent in a state that water is present in a proportion of 0.02 to 2.0 mol per mol of a charged sulfur source, thereby forming a polymer that a conversion of the dihalo-aromatic compound is 80 to 99%; and
II) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in a phase-separated state that a concentrated formed polymer phase and a dilute formed polymer phase are present in a mixed state within the polymerization reaction system.

The amount of the coexisting water in the reaction system in the first-stage polymerization step is within a range of generally 0.02 to 2.0 mol, preferably 0.05 to 2.0 mol, more preferably 0.5 to 2.0 mol, particularly preferably 1.0 to 1.9 mol per mol of the charged sulfur source. The amount of the coexisting water in the first-stage polymerization step may be small. However, undesirable reactions such as decomposition of a PAS formed are easy to occur if the amount of the coexisting water is too small. If the amount of the coexisting water exceeds 2.0 mol, a polymerization rate becomes markedly low, or decomposition of the organic amide solvent and a PAS formed is easy to occur. Thus, such a too small or great amount is not preferable. The polymerization is conducted within a temperature range of 170 to 270° C., preferably 180 to 265° C. If the polymerization temperature is too low, the polymerization rate becomes too slow. If the polymerization temperature is a high temperature exceeding 270° C. on the other hand, decomposition of a PAS formed and the organic amide solvent is easy to occur, and the polymerization degree of the PAS formed becomes extremely low.

If the amount of the coexisting water in the reaction system in the second-stage polymerization step is not more than 2.0 mol or more than 10 mol per mol of the charged sulfur source, the polymerization degree of a PAS formed is lowered. It is particularly preferred to conduct the second-stage polymerization in a state that the amount of the coexisting water falls within a range of 2.2 to 7 mol because a PAS having a high polymerization degree is easy to be obtained. If the polymerization temperature in the second-stage polymerization step is lower than 245° C., a PAS having a high polymerization degree is difficult to be obtained. If the polymerization temperature exceeds 290° C., there is a possibility that a PAS formed and the organic amide solvent may be decomposed. In particular, a temperature range of 250 to 270° C. is preferred because a PAS having a high polymerization degree is easy to be obtained. The second-stage polymerization step in the present invention is not the mere step of fractionating and granulating a polymer (may referred to as "a prepolymer") formed in the first-stage polymerization step, but a step of increasing the polymerization degree of the polymer. Water is preferably used as the phase separation agent in the second-stage polymerization step. However, another phase separation agent (polymerization aid; for example, an organic carboxylic acid metal salt) may be used in place of water or together with water within a range of preferably 0.01 to 3 mol per mol of the charged sulfur source.

When the alkali metal hydrosulfide is used as the sulfur source, the polymerization reaction in the polymerization step is preferably conducted through at least two-stage polymerization steps comprising:
(1) a first-stage polymerization step of heating a reaction mixture containing the organic amide solvent, the sulfur source, the dihalo-aromatic compound and an alkali metal hydroxide at a specific molar ratio to 170 to 270° C. in the presence of water in a proportion of generally 0.02 to 2.0 mol, preferably 0.05 to 2.0 mol, more preferably 0.5 to 2.0 mol per mol of the charged sulfur source to conduct a polymerization reaction, thereby forming a polymer that a conversion of the dihalo-aromatic compound is 80 to 99%, and (2) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction. Water is preferably used as the phase separation agent in the second-stage polymerization step. However, another phase separation agent (polymerization aid; for example, an organic carboxylic acid metal salt) may be used in place of water or together with water within a range of preferably 0.01 to 3 mol per mol of the charged sulfur source.

In the first-stage polymerization step, it is desirable to form a polymer (prepolymer) having a melt viscosity of generally 0.5 to 30 Pa·s as measured at a temperature of 310° C. and a shear rate of 1,216 sec$^{-1}$.

Water may be added at a final stage of the polymerization reaction or upon completion thereof to increase the water content for the purpose of lowering the contents of a secondarily produced alkali metal salt (for example, NaCl) and impurities in the polymer formed or collecting the polymer in the form of granules. The system of the polymerization reaction may be a batch system, a continuous system or a combination of both systems. In the batch-wise polymerization, 2 or more reaction vessels may be used, if desired, for the purpose of shortening the polymerization cycle time.

The conversion of the dihalo-aromatic compound in the first-state polymerization step is a value calculated out in accordance with each of the following equations. When the dihalo-aromatic compound (abbreviated as "DHA") is added in excess in terms of a molar ratio to the sulfur source, the conversion is calculated out in accordance with the following equation:

Conversion=[(Charged amount (mol) of DHA)−(Remaining amount (mol) of DHA)]/[(Charged amount (mol) of DHA)−(Excessive amount (mol) of DHA)]×100.

In other case, the conversion is calculated out in accordance with the following equation:

Conversion=[(Charged amount (mol) of DHA)−(Remaining amount (mol) of DHA)]/[(Charged amount (mol) of DHA)]×100.

10. Reaction with Hydroxyl Group-Containing Organic Compound

In the present invention, a reaction step of adding a hydroxyl group-containing organic compound containing no bonded halogen atom in a proportion of 0.01 to 20 mol per 100 mol of the charged sulfur source into the polymerization reaction system containing the organic amide solvent and the formed polymer to cause the formed polymer to react with the hydroxyl group-containing organic compound is arranged after such polymerization steps as described above. A collecting step of acquiring the polymer from the polymerization reaction system is arranged after this reaction step.

As the hydroxyl group-containing organic compound, is used at least one organic compound selected from the group consisting of aliphatic alcohols, alicyclic alcohols, aromatic alcohols and phenolic compounds which each do not contain a bonded halogen atom. The hydroxyl group-containing organic compound is preferably an organic compound having a boiling point of 100° C. or higher and containing one hydroxyl group.

Examples of the aliphatic alcohols include monohydric saturated aliphatic alcohols such as methanol, ethanol, 1-propanol, 2-propanol, 1-butanol, 2-butanol, 2-methyl-2-propanol, 2-methyl-1-propanol, 1-pentanol, 2-pentanol, 3-pentanol, 2-methyl-1-butanol, 3-methyl-1-butanol, 3-methyl-2-butanol, 2-methyl-2-butanol, 2,2-dimethyl-1-propanol, 1-hexanol, 2-hexanol, 3-hexanol, 2-methyl-1-pentanol, 2-methyl-2-pentanol, 4-methyl-1-pentanol, 4-methyl-2-pentanol, 3-methyl-1-pentanol, 3-methyl-2-pentanol, 3-methyl-3-pentanol, 2,3-dimethyl-1-butanol, 3,3-dimethyl-2-butanol, 1-heptanol, 2-heptanol, 3-heptanol, 4-heptanol, 3-ethyl-3-pentanol, 2,4-dimethyl-3-pentanol, 2,3,3-trimethyl-2-butanol, 1-octanol, 2-octanol, 2-ethyl-1-hexanol, 1-nonanol, 2-nonanol, 2,6-dimethyl-4-hepfanol, 1-decanol, 1-undecanol, 1-tridecanol, 1-tetradecanol, 1-pentadecanol, 1-hexadecanol, 1-heptadecaonol, 1-octadecanol, 1-hexacosanol, 1-triacontanol and 1-hentriacontanol; monohydric unsaturated aliphatic alcohols such as allyl alcohol, trans-2-buten-1-ol and 3-buten-1-ol; dihydric alcohols such as ethylene glycol, 1,2-propanediol and 1,3-propanediol; and polyhydric alcohols such as glycerol and pentaerythritol. These aliphatic alcohols may be used either singly or in any combination thereof.

As examples of the alicyclic alcohols, may be mentioned monohydric alicyclic alcohols such as cyclopentanol, cyclohexanol, 1-methylcyclohexanol, cis-2-methyl-cyclohexanol, trans-2-methylcyclohexanol, cis-3-methyl-cyclohexanol, trans-3-methylcyclohexanol, cis-4-methylcyclohexanol and trans-4-methylcyclohexanol. These alicyclic alcohols may be used either singly or in any combination thereof.

The aromatic alcohol is an alcohol having an aromatic ring, to other carbon atom(s) than carbon atoms forming the aromatic ring of which a hydroxyl group is bonded. As examples of the aromatic alcohol, may be mentioned monohydric aromatic alcohols such as benzyl alcohol, o-tolylmethanol, m-tolylmethanol, p-tolylmethanol, p-isopropylbenzyl alcohol, 1-phenylethanol, 2-phenylethanol, 1-phenyl-1-propanol, 1-phenyl-2-propanol and 3-phenyl-1-propanol. These aromatic alcohols may be used either singly or in any combination thereof.

The phenolic compound is an alcohol, to a carbon atom of the aromatic ring of which a hydroxyl group is bonded. As examples of the phenolic compound, may be mentioned monohydric phenolic compounds such as phenol, cresol, ethylphenol, p-t-butylphenol, p-t-pentylphenol, xylenol, 2,6-di-t-butyl-p-cresol, pentamethylphenol and phenoxyphenol. These phenolic compounds may be used either singly or in any combination thereof.

In the present invention, at least one of these hydroxyl group-containing organic compounds is used. The hydroxyl group-containing organic compound is preferably an organic compound having a boiling point of 100° C. or higher and containing one hydroxyl group. The boiling point of the hydroxyl group-containing organic compound is preferably within a range of 100 to 290° C. The hydroxyl group-containing organic compound is preferably liquid at ordinary temperature (23° C.) from the viewpoint of handling. When the hydroxyl group-containing organic compound is solid at ordinary temperature, the melting point thereof is preferably 100° C. or lower. If the melting point of the hydroxyl group-containing organic compound is too high, handling upon its introduction under pressure into the polymerization reaction system becomes difficult, or a solvent is required to convert it to a liquid state.

Among the hydroxyl group-containing organic compounds, aromatic alcohols such as benzyl alcohol and phenolic compounds such as phenoxyalcohol are preferred, and aromatic alcohols such as benzyl alcohol are more preferred in that they are excellent in the effect to reduce the bonded halogen atoms.

The hydroxyl group-containing organic compound is added into the polymerization reaction system containing the organic amide solvent and the formed polymer after the polymerization step. The proportion of the hydroxyl group-containing organic compound added is within a range of 0.001 to 20 mol, preferably 0.01 to 10 mol, more preferably 0.05 to 5 mol per 100 mol of the charged sulfur source.

After the hydroxyl group-containing organic compound is added into the polymerization reaction system, the formed polymer is reacted with the hydroxyl group-containing organic compound under conditions of a temperature ranging generally from 170 to 290° C., preferably from 200 to 280° C., more preferably from 245 to 270° C. and a reaction time ranging generally from 5 minutes to 3 hours, preferably from 30 minutes to 2 hours. A reaction product between the poly(arylene sulfide) and the hydroxyl group-containing organic compound is formed by this reaction, whereby at least part of bonded halogen atoms including halogen atom(s) bonded to terminal(s) of its polymer chain are removed. It may be presumed that a residue (for example, an ether group) of the hydroxyl group-containing organic compound, which is formed by the reaction of the hydroxyl group-containing organic compound with the halogen atoms, is bonded to the reaction product. In this reaction step, the molecular weight of the PAS formed may also be more increased. The molecular weight of the PAS formed may be lowered in the reaction step with the hydroxyl group-containing organic compound in some cases according to the reaction conditions in the polymerization step and the subsequent reaction step.

The production process according to the present invention preferably comprises a phase-separation polymerization step of creating a phase-separated state that a concentrated formed polymer phase and a dilute formed polymer phase are present in a mixed state within the polymerization reaction system in the presence of the phase separation agent after the polymerization reaction of at least one sulfur source selected from the group consisting of alkali metal sulfides and alkali metal hydrosulfides with the dihalo-aromatic compound is initiated in the polymerization step and continuing the polymerization reaction in this phase-separated state.

When the phase-separated state that the concentrated formed polymer phase and the dilute formed polymer phase are present in a mixed state within the polymerization reaction system (liquid phase) is created in the presence of the phase separation agent, the concentration of PAS in the concentrated phase is generally 30 to 70% by mass, preferably 40 to 60% by mass, more preferably 45 to 55% by mass. The concentration of PAS in the dilute phase is generally 0 to 10% by mass, preferably 0 to 8% by mass, more preferably 0 to 5% by mass. In the polymerization step, the polymerization reaction is generally caused to proceed in a state that the concentrated formed polymer phase has been dispersed as droplets in the dilute formed polymer phase because the polymerization reaction system (liquid phase) is stirred.

When the polymerization step comprises the phase-separation polymerization step, it is preferable from the viewpoint of raising the reaction efficiency that the hydroxyl group-containing organic compound is added into the polymerization reaction system lying in the phase-separated state after the phase-separation polymerization step to cause the formed polymer to react with the hydroxyl group-containing organic compound while retaining the phase-separated state. When the hydroxyl group-containing organic compound is added while retaining the state that the concentrated formed polymer phase has been dispersed as droplets in the dilute formed polymer phase under stirring, the hydroxyl group-containing organic compound migrates to the concentrated formed polymer phase and efficiently reacts with the formed polymer therein.

As preferred embodiments of the production process according to the present invention, may be mentioned the following production processes comprising a phase-separation polymerization step.

As a first production process, may be mentioned a production process, in which the polymerization step comprises a phase-separation polymerization step of continuing the polymerization reaction in the presence of a phase separation agent in a phase-separated state that a concentrated formed polymer phase and a dilute formed polymer phase are present in a mixed state within the polymerization reaction system after the polymerization reaction of at least one sulfur source selected from the group consisting of alkali metal sulfides and alkali metal hydrosulfides with the dihalo-aromatic compound is initiated, the reaction step is a step of adding the hydroxyl group-containing organic compound into the polymerization reaction system lying in the phase-separated state after the phase-separation polymerization step to cause the formed polymer to react with the hydroxyl group-containing organic compound while retaining the phase-separated state, and the recovering step is a collecting step of collecting a polymer formed in the reaction step from the polymerization reaction system containing the formed polymer after the reaction step.

As a second production process, may be mentioned a production process, in which the polymerization step comprises:
i) a first-stage polymerization step of subjecting at least one sulfur source selected from the group consisting of alkali metal sulfides and alkali metal hydrosulfides and the dihalo-aromatic compound to a polymerization reaction in the organic amide solvent to form a polymer that a conversion of the dihalo-aromatic compound is 80 to 99%; and
ii) a second-stage polymerization step of continuing the polymerization reaction in the presence of the phase separation agent in the phase-separated state that the concentrated formed polymer phase and the dilute formed polymer phase are present in a mixed state within the polymerization reaction system,
the reaction step is a step of adding the hydroxyl group-containing organic compound into the polymerization reaction system lying in the phase-separated state after the second-stage polymerization step to cause the formed polymer to react with the hydroxyl group-containing organic compound while retaining the phase-separated state, and
the recovering step is a collecting step of collecting a polymer formed in the reaction step from the polymerization reaction system containing the formed polymer after the reaction step.

As a third production process, may be mentioned a production process, in which the polymerization step comprises:
I) a first-stage polymerization step of subjecting at least one sulfur source selected from the group consisting of alkali metal sulfides and alkali metal hydrosulfides and the dihalo-aromatic compound to a polymerization reaction at a temperature of 170 to 270° C. in the organic amide solvent in a state that water is present in a proportion of generally 0.02 to 2.0 mol, preferably 0.05 to 2.0 mol, more preferably 0.5 to 2.0 mol per mol of the charged sulfur source, thereby forming a polymer that a conversion of the dihalo-aromatic compound is 80 to 99%; and
II) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in the phase-separated state that the concentrated formed polymer phase and the dilute formed polymer phase are present in a mixed state within the polymerization reaction system, the reaction step is a step of adding the hydroxyl group-containing organic compound into the polymerization reaction system lying in the phase-separated state after the second-stage polymerization step to cause the formed polymer to react with the hydroxyl group-containing organic compound while retaining the phase-separated state, and the recovering step is a collecting step of collecting a polymer formed in the reaction step from the polymerization reaction system containing the formed polymer after the reaction step.

In the second-stage polymerization step, water is preferably used as the phase separation agent. However, another phase separation agent (polymerization aid; for example, an organic carboxylic acid metal salt) may be used in place of water or together with water within a range of preferably 0.01 to 3 mol per mol of the charged sulfur source.

As a fourth production process, may be mentioned a production process comprising:

1) a dehydration step of heating a mixture containing the organic amide solvent, a sulfur source containing an alkali metal hydrosulfide, and an alkali metal hydroxide in a proportion of 0.95 to 1.05 mol per mol of the alkali metal hydrosulfide to discharge at least a part of a distillate containing water from the interior of the system containing the mixture to the exterior of the system;

2) a charging step of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol, preferably more than 1.00 mol, but not more than 1.09 mol per mol of a charged sulfur source existing in the system after the dehydration step, and the number of moles of water becomes generally 0.02 to 2.0 mol, preferably 0.05 to 2.0 mol, more preferably 0.5 to 2.0 mol per mol of the charged sulfur source;

3) a first-stage polymerization step of adding the dihalo-aromatic compound to the mixture to subject the sulfur source and the dihalo-aromatic compound to a polymerization reaction at a temperature of 170 to 270° C. in the organic amide solvent, thereby forming a polymer that a conversion of the dihalo-aromatic compound is 80 to 99%;

4) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in the phase-separated state that the concentrated formed polymer phase and the dilute formed polymer phase are present in a mixed state within the polymerization reaction system;

5) a step of adding the hydroxyl group-containing organic compound into the polymerization reaction system lying in the phase-separated state after the second-stage polymerization step to cause the formed polymer to react with the hydroxyl group-containing organic compound while retaining the phase-separated state; and 6) a collecting step of collecting a polymer formed in the reaction step from the polymerization reaction system containing the formed polymer after the reaction step.

In the second-stage polymerization step, water is preferably used as the phase separation agent. However, another phase separation agent (polymerization aid; for example, an organic carboxylic acid metal salt) may be used in place of water or together with water within a range of preferably 0.01 to 3 mol per mol of the charged sulfur source.

When water is used as the phase separation agent in the polymerization step of the present invention, such a 2-stage polymerization process as described above is preferably adopted. The above-described second-stage polymerization steps are each a phase-separation polymerization step. No phase-separated state appears in the first-stage polymerization step. In the second-stage polymerization step in which water has been added, the polymerization reaction system (liquid phase) is phase-separated into a concentrated polymer phase high in the content of the polymer formed in the first-stage polymerization and a dilute polymer phase low in the content of the polymer. The phase-separated state can be visually clearly observed. Even when water is used as the phase separation agent in the second-stage polymerization step, another phase separation agent (polymerization aid; for example, an organic carboxylic acid metal salt) may be used within a range of preferably 0.01 to 3 mol per mol of the charged sulfur source.

If the hydroxyl group-containing organic compound is added at an initial stage of the polymerization reaction, for example, in the charging step, the molecular weight (melt viscosity) of a PAS formed is lowered to encounter difficulty on obtaining a high-molecular weight PAS. If the hydroxyl group-containing organic compound is added in a step (first-stage polymerization step) prior to the phase-separation polymerization step, the molecular weight (melt viscosity) of a PAS formed is also lowered. In the production process according to the present invention, it is preferable to adopt a process, in which the hydroxyl group-containing organic compound is added into the polymerization reaction system lying the phase-separated state after the second-stage polymerization step to cause the formed polymer to react with the hydroxyl group-containing organic compound while retaining the phase-separated state because the terminal halogen atoms of the formed polymer can be caused to efficiently react with the hydroxyl group-containing organic compound. This phase-separated state means a liquid-liquid phase-separated state. If the temperature within the polymerization reaction system is too low, the formed polymer comes to be solidified and precipitated. In such a solid-liquid phase-separated state, the reaction efficiency between the hydroxyl group-containing organic compound and the formed PAS is markedly lowered.

11. Collecting Step

In the production process according to the present invention, a post treatment after the reaction may be conducted in the same manner as in the post treatment after an ordinary polymerization reaction. For example, after completion of the reaction, a product slurry cooled is separated by filtration as it is or after diluted with water or the like, and the resulting filter cake is washed and filtered repeatedly and then dried, whereby a PAS can be collected. The washing is preferably conducted by a suitable combination of water washing, washing with an organic solvent, acid washing, etc. until a secondarily formed alkali metal salt and oligomers are removed.

According to the production process comprising the phase-separation polymerization step, a granular PAS can be formed, so that a method of separating the granular PAS from the reaction mixture by a method of sieving the polymer by means of a screen is preferably adopted because the polymer can be easily separated from by-products, oligomers, etc. The product slurry may be subjected to sieving in a high-temperature state, thereby collecting the polymer.

After the separation by filtration, the PAS is preferably washed with the same organic amide solvent as the polymerization solvent, or an organic solvent such as a ketone (for example, acetone) or an alcohol (for example, methanol). The PAS may be washed with hot water or the like. The formed PAS may also be treated with an acid or a salt such as ammonium chloride.

12. Poly(Arylene Sulfide)

According to the production process of the present invention, a PAS whose content (also referred to as "halogen content" merely) of bonded halogen atoms mainly composed of terminal halogen groups has been reduced can be produced. The content of the bonded halogen atoms is generally lower than 4,000 ppm, preferably 3,900 ppm or lower, more preferably 3,800 ppm or lower. In many cases, the content of the bonded halogen atoms can be reduced to 2,000 ppm or lower, further to 1,500 ppm or lower. The lower limit of the content of the bonded halogen atoms is generally 50 ppm, often 100 ppm or 200 ppm.

In order to further reduce the content of the bonded halogen atoms in the PAS, for example, the treatment method for PAS disclosed in Patent Literature 2 may be added. However, a large amount of a filler is added when the PAS according to the present invention is used as a sealing compound for electronic parts, so that the PAS can be practically used without causing inconvenience even when the content of the bonded halogen atoms falls within the above range, and the PAS can satisfy the level of requirements of halogen content reduction in products from various fields. The PAS according to the present invention can be used as a sealing compound for electronic parts as a compound containing a large amount of a filler. The PPS content in the compound is lowered by adding the filler, so that the content of the bonded halogen atoms is also lowered to about 50 to 60% by mass. When the content of the bonded halogen atoms in the compound is 800 to 900 ppm or lower, such a PAS can meet, for example, the regulation value in Europe and the requirement value by the industries associated with electronic parts. Therefore, the content of the bonded halogen atoms in the PAS is particularly desirably 1,500 ppm or lower.

The content of the bonded halogen atoms can be reduced to 2,000 ppm or lower, further to 1,500 ppm or lower without lowering the average particle diameter, yield, etc. by, for example, controlling the amount of the dihalo-aromatic compound charged within a range of from more than 1.00 mol to less than 1.06 mol, preferably 1.01 to 1.05 mol per mol of the sulfur source (alkali metal sulfide and/or alkali metal hydrosulfide) remaining in the system after the dehydration step and using an aromatic alcohol such as benzyl alcohol as the hydroxyl group-containing organic compound in the production process according to the present invention as shown in Example 1 which will be described subsequently.

The content of the bonded halogen atoms can be reduced to 1,500 ppm or lower, further to 1,000 ppm or lower by, for example, controlling the amount of the dihalo-aromatic compound charged within a range of 1.06 to 1.09 mol per mol of the sulfur source (alkali metal sulfide and/or alkali metal hydrosulfide) remaining in the system after the dehydration step and using an aromatic alcohol such as benzyl alcohol as the hydroxyl group-containing organic compound in the production process according to the present invention as shown in Example 2 which will be described subsequently. In this case, the resultant PAS shows a tendency to low its melt viscosity. However, a filler can thereby be filled in a high proportion therein, so that the PAS can be suitably applied to uses such as a sealing compound.

According to the production process of the present invention, a PAS having a melt viscosity of generally 1 to 100 Pa·s, preferably 2 to 80 Pa·s, particularly preferably 3 to 70 Pa·s as measured at a temperature of 310° C. and a shear rate of 1,216 sec$^{-1}$ can be obtained. According to the production process of the present invention, a PAS having a weight-average molecular weight of generally 10,000 to 60,000, preferably 13,000 to 55,000, particularly preferably 14,000 to 50,000 can be obtained.

According to the production process of the present invention, a granular polymer captured on a screen having a sieve opening size of 150 p.m (100 mesh) can be collected at a yield of generally 80 to 98%, preferably 83 to 97%, particularly preferably 85 to 95%. According to the production process of the present invention, a granular PAS having an average particle diameter of 100 to 1,000 μm, preferably 150 to 800 μm, more preferably 200 to 500 μm can be obtained.

When the above-described features are summarized, according to the production process of the present invention, there can be provided a poly(arylene sulfide) obtained by subjecting at least one sulfur source selected from the group consisting of alkali metal sulfides and alkali metal hydrosulfides and the dihalo-aromatic compound to a polymerization reaction in the organic amide solvent, wherein (a) at least part of halogen atoms bonded to terminals of its polymer chain have been removed by a reaction with the hydroxyl group-containing organic compound, (b) the melt viscosity thereof is 1 to 100 Pa·s as measured at a temperature of 310° C. and a shear rate of 1,216 sec$^{-1}$, (c) the weight-average molecular weight thereof is 10,000 to 60,000 as measured by gel permeation chromatography, (d) the average particle diameter thereof is 100 to 1,000 μm as measured by a sifting method, and (e) the content of bonded halogen atoms thereof is lower than 4,000 ppm as measured by the flask combustion method.

The PAS obtained by the production process according to the present invention can be molded or formed into various injection-molded products (including sealed molded products by injection) or extruded products such as sheets, films, fibers and pipes either singly or by incorporating various kinds of inorganic fillers, fibrous fillers and/or various kinds of synthetic resins as it is or after subjected to oxidative crosslinking. The PAS may also be used as a covering material. The PAS is particularly preferably PPS.

EXAMPLES

The present invention will hereinafter be described more specifically by the following Examples and Comparative Example. However, the present invention is not limited to these examples alone. Measuring methods of physical properties and properties or characteristics in the present invention are as follows.

(1) Yield

After a reaction, the reaction mixture was sifted through a plurality of screens different in sieve opening size and then fractionated and washed. A polymer captured on a screen having a sieve opening size of 150 μm (100 mesh) was regarded as "a granular polymer". Assuming that all the available sulfur component in a charged sulfur source existing in a reaction vessel after a dehydration step was converted to a polymer, the yield of the granular polymer was based on the mass (theoretical amount) of that polymer. When the charged sulfur source is charged in excess in terms of a molar ratio to the dihalo-aromatic compound, all the charged sulfur source may not be converted to a polymer in some cases. Even in that case, the yield is calculated out on the basis of the amount of the charged sulfur source for the present.

(2) Average Particle Diameter

The average particle diameter of a polymer collected was measured by a sifting method using sieves of mesh #7 (sieve opening size: 2,800 μm), mesh #12 (sieve opening size: 1,410 μm), mesh #16 (sieve opening size: 1,000 μm), mesh #24 (sieve opening size: 710 μm), mesh #32 (sieve opening size: 500 μm), mesh #60 (sieve opening size: 250 μm), mesh #100 (sieve opening size: 150 μm), mesh #145 (sieve opening size: 105 μm) and mesh #200 (sieve opening size: 75 μm) as sieves used.

(3) Content of Bonded Halogen Atom

A polymer sample, from which all of secondarily produced alkali metal salts had been substantially removed by washing, was used to measure a content of a halogen (chlorine) atom by the flask combustion method.

(4) Weight-Average Molecular Weight

The weight-average molecular weight (Mw) of a polymer was measured under the following conditions by using a high-temperature gel permeation chromatograph (GPC) SSC-7000 manufactured by Senshu Scientific Co., Ltd. The weight-average molecular weight was calculated out as a value converted from polystyrene.
Solvent: 1-chloronaphthalene,
Temperature: 210° C.,
Detector: UV detector (360 nm),
Amount of sample injected: 200 μl (concentration: 0.05% by mass),
Flow rate: 0.7 ml/min, and
Standard polystyrene: 5 standard polystyrenes of 616,000, 113,000, 26,000, 8,200 and 600.

(5) Melt Viscosity

A melt viscosity was measured by using about 20 g of a dry granular polymer by means of Capirograph 1-C (trademark) manufactured by Toyo Seiki Seisakusho, Ltd.). A flat die with a capillary of 1 mm in diameter×10 mm in length was used, and the temperature was set to 310° C. After the polymer sample was introduced into the apparatus and held for 5 minutes, the melt viscosity was measured at a shear rate of 1,216 sec$^{-1}$.

Comparative Example 1

A 20-liter autoclave was charged with 5,999 g of N-methyl-2-pyrrolidone (hereinafter abbreviated as "NMP"), 2,000 g of sodium hydrosulfide (NaSH; purity: 62% by mass, containing 15 g of $Na_2S$) and 1,192 g of sodium hydroxide (NaOH; purity: 73.5% by mass). A molar ratio of sodium hydroxide/sulfur source (NaOH/S) was 0.978, and a molar ratio of NaOH/NaSH was 0.990. These sodium hydrosulfide and sodium hydroxide of the respective purities contain water such as water of hydration as a remaining component.

After the interior of the autoclave was purged with nitrogen gas, the contents were gradually heated to 200° C. over about 4 hours with stirring to distill off 997 g of water ($H_2O$), 1,244 g of NMP and 12 g of hydrogen sulfide ($H_2S$).

After the dehydration step, the contents in the autoclave were cooled to 150° C., and 3,416 g of p-dichlorobenzene (hereinafter abbreviated as "pDCB"), 3,464 g of NMP, 40 g of sodium hydroxide (high-purity product) and 145 g of water were added. A ratio (NMP/charged S; g/mol) of NMP/charged sulfur source (hereinafter abbreviated as "charged S") in the autoclave was 375, a ratio (mol/mol) of pDCB/charged S was 1.06, a ratio (mollmol) of $H_2O$/charged S was 1.50, and a ratio (mollmol) of NaOHlcharged S was 1.07.

While stirring the contents in the autoclave at 250 rpm by a stirrer, a reaction was conducted at 220° C. for 3 hours to conduct first-stage polymerization. A conversion into a polymer by the first-stage polymerization was 93%. The number of revolutions of the stirrer was then increased to 400 rpm, and 454 g of water was charged under pressure while continuing the stirring. A ratio (mollmol) of $H_2O$/charged S was 2.65. The contents in the autoclave were heated to 255° C. and reacted for 4 hours to conduct second-stage polymerization.

After completion of the second-stage polymerization, the contents were cooled near to room temperature and then sifted through a 100-mesh screen to collect a granular polymer. The granular polymer was washed 3 times with acetone, 3 times with water, once with an aqueous solution of acetic acid adjusted to a pH of 4 and then additionally 4 times with water to obtain a washed granular polymer. The granular polymer was dried for 24 hours at a temperature of 100° C. in a thermostatic chamber. The yield of the granular polymer thus obtained was 88%, and the polymer had an average particle diameter of 350 μm, a melt viscosity of 30 Pa·s, a weight-average molecular weight Mw of 46,000 and a chlorine content of 4,000 ppm. The results are shown in Table 1.

Example 1

A 20-liter autoclave was charged with 6,002 g of N-methyl-2-pyrrolidone (NMP), 2,000 g of sodium hydrosulfide (NaSH; purity: 62% by mass, containing 25 g of $Na_2S$) and 1,188 g of sodium hydroxide (NaOH; purity: 73.5% by mass). A molar ratio of sodium hydroxide/sulfur source (NaOH/S) was 0.967, and a molar ratio of NaOH/NaSH was 0.987.

After the interior of the autoclave was purged with nitrogen gas, the contents were gradually heated to 200° C. over about 4 hours with stirring to distill off 983 g of water ($H_2O$), 1,019 g of NMP and 13 g of hydrogen sulfide ($H_2S$).

After the dehydration step, the contents in the autoclave were cooled to 150° C., and 3,287 g of p-dichlorobenzene (pDCB), 3,197 g of NMP, 9 g of sodium hydroxide (high-purity product) and 133 g of water were added. A ratio (NMP/charged S; g/mol) of NMP/charged sulfur source (charged S) in the autoclave was 375, a ratio (mollmol) of pDCB/charged S was 1.025, a ratio (mol/mol) of $H_2O$/charged S was 1.50, and a ratio (mol/mol) of NaOH/charged S was 1.05.

While stirring the contents in the autoclave at 250 rpm by a stirrer, a reaction was conducted at 220° C. for 3 hours to conduct first-stage polymerization. A conversion into a polymer by the first-stage polymerization was 94%. The number of revolutions of the stirrer was then increased to 400 rpm, and 452 g of water was charged under pressure while continuing the stirring. A ratio (mol/mol) of $H_2O$/charged S was 2.65. The contents in the autoclave were heated to 255° C. and reacted for 4 hours to conduct second-stage polymerization. After completion of the second-stage polymerization, benzyl alcohol was charged under pressure in a proportion of 0.1 mol per 100 mol of the charged sulfur source by a pump to conduct a reaction for additionally 1 hour.

After the reaction system was cooled near to room temperature, the contents were treated under the same conditions as in Comparative Example 1. The yield of the granular polymer thus obtained was 92%, and the polymer had an average particle diameter of 400 tun, a melt viscosity of 31

Pa·s, a weight-average molecular weight Mw of 48,000 and a chlorine content of 1,200 ppm. The results are shown in Table 1.

Example 2

First-stage polymerization and second-stage polymerization were conducted under the same conditions as in Comparative Example 1. After completion of the second-stage polymerization, benzyl alcohol was charged under pressure in a proportion of 0.1 mol per 100 mol of the charged sulfur source by a pump to conduct a reaction for additionally 1 hour. After the reaction system was cooled near to room temperature, the contents were treated under the same conditions as in Comparative Example 1. The yield of the granular polymer thus obtained was 87%, and the polymer had an average particle diameter of 250 μm, a melt viscosity of 5 Pa·s, a weight-average molecular weight Mw of 18,000 and a chlorine content of 800 ppm. The results are shown in Table 1.

Example 3

First-stage polymerization and second-stage polymerization were conducted under the same conditions as in Comparative Example 1. After completion of the second-stage polymerization, phenoxyphenol was charged under pressure in a proportion of 0.1 mol per 100 mol of the charged sulfur source by a pump to conduct a reaction for additionally 1 hour. After the reaction system was cooled near to room temperature, the contents were treated under the same conditions as in Comparative Example 1. The yield of the granular polymer thus obtained was 90%, and the polymer had an average particle diameter of 350 μm, a melt viscosity of 22 Pa·s, a weight-average molecular weight Mw of 33,000 and a chlorine content of 3,700 ppm. The results are shown in Table 1.

TABLE 1

| | | Hydroxyl group-containing organic compound | | | Polymer | | | |
|---|---|---|---|---|---|---|---|---|
| | pDCB/charged sulfur source mol/mol | Kind | Organic compound/ charged S mol/mol | Time added | Cl content ppm | M.V. Pa·s | Mw | Yield % | Particle diameter μm |
| Example 1 | 1.025/1 | Benzyl alcohol | 0.1/100 | After second-stage polymerization | 1,200 | 31 | 48,000 | 92 | 400 |
| Example 2 | 1.06/1 | Benzyl alcohol | 0.1/100 | After second-stage polymerization | 800 | 5 | 18,000 | 87 | 250 |
| Example 3 | 1.06/1 | Phenoxyphenol | 0.1/100 | After second-stage polymerization | 3,700 | 22 | 33,000 | 90 | 350 |
| Comparative Example 1 | 1.06/1 | — | — | — | 4,000 | 30 | 46,000 | 88 | 350 |

INDUSTRIAL APPLICABILITY

The poly(arylene sulfides) obtained by the production process according to the present invention can be molded or formed into various injection-molded products or extruded products such as sheets, films, fibers and pipes either singly or by incorporating various kinds of inorganic fillers, fibrous fillers and/or various kinds of synthetic resins as it is or after subjected to oxidative crosslinking. The poly(arylene sulfides) according to the present invention can be particularly suitably utilized in a wide variety of fields such as electrical and electronic equipments and automotive equipments, including sealing compounds for electronic parts.

The invention claimed is:

1. A production process of a poly(arylene sulfide), comprising the following steps:
   (1) a polymerization step of subjecting at least one sulfur source selected from the group consisting of alkali metal sulfides and alkali metal hydrosulfides and a dihalo-aromatic compound to a polymerization reaction in an organic amide solvent;
   (2) a reaction step of adding a hydroxyl group-containing organic compound containing no bonded halogen atom in a proportion of 0.001 to 20 mol per 100 mol of the charged sulfur source into the polymerization reaction system containing the organic amide solvent and a polymer formed in the polymerization step after the polymerization step to cause the formed polymer to react with the hydroxyl group-containing organic compound; and
   (3) a collecting step of collecting a polymer formed in the reaction step from the polymerization reaction system containing the formed polymer after the reaction step.

2. The production process according to claim 1, wherein the polymerization step comprises a phase-separation polymerization step of continuing the polymerization reaction in the presence of a phase separation agent in a phase-separated state that a concentrated formed polymer phase and a dilute formed polymer phase are present in a mixed state within the polymerization reaction system after the polymerization reaction of at least one sulfur source selected from the group consisting of alkali metal sulfides and alkali metal hydrosulfides with the dihalo-aromatic compound is initiated, and wherein
   the reaction step is a step of adding the hydroxyl group-containing organic compound into the polymerization reaction system lying in the phase-separated state after the phase-separation polymerization step to cause the formed polymer to react with the hydroxyl group-containing organic compound while retaining the phase-separated state.

3. The production process according to claim 1, wherein the polymerization step comprises:
   i) a first-stage polymerization step of subjecting at least one sulfur source selected from the group consisting of alkali metal sulfides and alkali metal hydrosulfides and the dihalo-aromatic compound to a polymerization reaction in the organic amide solvent to form a polymer that a conversion of the dihalo-aromatic compound is 80 to 99%; and
   ii) a second-stage polymerization step of continuing the polymerization reaction in the presence of a phase separation agent in a phase-separated state that a concentrated formed polymer phase and a dilute formed polymer phase are present in a mixed state within the polymerization reaction system, and wherein the reaction step is a step of adding the hydroxyl group-containing organic compound into the polymerization reaction system lying in the phase-separated state after the second-stage polymerization step to cause the formed polymer to react with the hydroxyl group-containing organic compound while retaining the phase-separated state.

4. The production process according to claim 1, wherein the polymerization step comprises:

I) a first-stage polymerization step of subjecting at least one sulfur source selected from the group consisting of alkali metal sulfides and alkali metal hydrosulfides and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%; and II) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in a phase-separated state that a concentrated formed polymer phase and a dilute formed polymer phase are present in a mixed state within the polymerization reaction system, and wherein the reaction step is a step of adding the hydroxyl group-containing organic compound into the polymerization reaction system lying in the phase-separated state after the second-stage polymerization step to cause the formed polymer to react with the hydroxyl group-containing organic compound while retaining the phase-separated state.

5. The production process according to claim 1, wherein prior to the polymerization step, are arranged 1) a dehydration step of heating a mixture containing the organic amide solvent, a sulfur source containing an alkali metal hydrosulfide, and an alkali metal hydroxide in a proportion of 0.95 to 1.05 mol per mol of the alkali metal hydrosulfide to discharge at least a part of a distillate containing water from the interior of the system containing the mixture to the exterior of the system; and 2) a charging step of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration step becomes 1.00 to 1.09 mol per mol of a charged sulfur source existing in the system after the dehydration step, and the number of moles of water becomes 0.02 to 2.0 mol per mol of the charged sulfur source, wherein the polymerization step comprises:

3) a first-stage polymerization step of adding the dihalo-aromatic compound to the mixture to subject the sulfur source and the dihalo-aromatic compound to a polymerization reaction at a temperature of 170 to 270° C. in the organic amide solvent, thereby forming a polymer that a conversion of the dihalo-aromatic compound is 80 to 99%; and 4) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in a phase-separated state that a concentrated formed polymer phase and a dilute formed polymer phase are present in a mixed state within the polymerization reaction system; and wherein the reaction step is a step of adding the hydroxyl group-containing organic compound into the polymerization reaction system lying in the phase-separated state after the second-stage polymerization step to cause the formed polymer to react with the hydroxyl group-containing organic compound while retaining the phase-separated state.

6. The production process according to claim 1, wherein in the polymerization step, the dihalo-aromatic compound is caused to react in an amount of from more than 1.00 mol to not more than 1.09 mol per mol of the charged sulfur source.

7. The production process according to claim 1, wherein in the reaction step, the hydroxyl group-containing organic compound is added into the polymerization reaction system containing the organic amide solvent and the polymer formed in the polymerization step after the polymerization step, and the formed polymer is then reacted with the hydroxyl group-containing organic compound under conditions of a temperature ranging from 170 to 290° C. and a reaction time ranging from 5 minutes to 3 hours.

8. The production process according to claim 1, wherein in the collecting step, a poly(arylene sulfide) having a melt viscosity of 1 to 100 Pa·s as measured at a temperature of 310° C. and a shear rate of 1,216 sec$^{-1}$, a weight-average molecular weight of 10,000 to 60,000 as measured by gel permeation chromatography, an average particle diameter of 100 to 1,000 μm as measured by a sifting method and a bonded halogen atom content of lower than 4,000 ppm as measured by the flask combustion method is collected.

9. The production process according to claim 1, wherein the hydroxyl group-containing organic compound is at least one hydroxyl group-containing organic compound selected from the group consisting of aliphatic alcohols, alicyclic alcohols, aromatic alcohols and phenolic compounds.

10. The production process according to claim 1, wherein the hydroxyl group-containing organic compound is a hydroxyl group-containing organic compound having a boiling point of 100° C. or higher and containing one hydroxyl group.

11. The production process according to claim 1, wherein the hydroxyl group-containing organic compound is at least one aromatic alcohol selected from the group consisting of benzyl alcohol, o-tolylmethanol, m-tolylmethanol, p-tolylmethanol, p-isopropylbenzyl alcohol, 1-phenylethanol, 2-phenylethanol, 1-phenyl-1-propanol, 1-phenyl-2-propanol and 3-phenyl-1-propanol.

12. The production process according to claim 1, wherein the hydroxyl group-containing organic compound is at least one phenolic compound selected from the group consisting of phenol, cresol, ethylphenol, p-t-butylphenol, p-t-pentylphenol, xylenol, 2,6-di-t-butyl-p-cresol, pentamethylphenol and phenoxyphenol.

13. A poly(arylene sulfide) obtained by subjecting at least one sulfur source selected from the group consisting of alkali metal sulfides and alkali metal hydrosulfides and a dihaloaromatic compound to a polymerization reaction in an organic amide solvent, wherein
- (a) the poly(arylene sulfide) is a reaction product with a hydroxyl group-containing organic compound containing no bonded halogen atom, and at least part of bonded halogen atoms thereof have been removed by a reaction with the hydroxyl group-containing organic compound,
- (b) the melt viscosity thereof is 1 to 100 Pa·s as measured at a temperature of 310° C. and a shear rate of 1,216 $\sec^{-1}$,
- (c) the weight-average molecular weight thereof is 10,000 to 60,000 as measured by gel permeation chromatography,
- (d) the average particle diameter thereof is 100 to 1,000 μm as measured by a sifting method, and
- (e) the content of bonded halogen atoms thereof is lower than 4,000 ppm as measured by the flask combustion method.

14. The poly(arylene sulfide) according to claim 13, wherein the content of bonded halogen atoms is 3,900 ppm or lower.

15. The poly(arylene sulfide) according to claim 13, wherein the content of bonded halogen atoms is 2,000 ppm or lower.

* * * * *